United States Patent
Vijayasankar et al.

(10) Patent No.: US 11,689,244 B2
(45) Date of Patent: Jun. 27, 2023

(54) WIRELESS NETWORK WITH CHANNEL HOPPING

(71) Applicant: TEXAS INSTRUMENTS INCORPORATED, Dallas, TX (US)

(72) Inventors: Kumaran Vijayasankar, Allen, TX (US); Jyothsna Kunduru, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/231,778

(22) Filed: Apr. 15, 2021

(65) Prior Publication Data

US 2021/0234573 A1    Jul. 29, 2021

Related U.S. Application Data

(63) Continuation of application No. 16/140,028, filed on Sep. 24, 2018, now Pat. No. 11,005,523.

(51) Int. Cl.
*H04B 1/00*        (2006.01)
*H04B 1/7143*      (2011.01)
*H04B 1/7156*      (2011.01)
*H04B 1/7136*      (2011.01)

(52) U.S. Cl.
CPC ......... *H04B 1/7143* (2013.01); *H04B 1/7136* (2013.01); *H04B 1/7156* (2013.01); *H04B 2001/71367* (2013.01); *H04B 2001/71563* (2013.01)

(58) Field of Classification Search
CPC .......... H04B 2001/7154; H04B 1/7143; H04B 1/713; H04B 1/7136; H04W 84/18; H04W 74/02; H04W 74/006
USPC .................................................. 375/132, 138
See application file for complete search history.

(56) References Cited

U.S. PATENT DOCUMENTS

| | | | |
|---|---|---|---|
| 2008/0175198 A1* | 7/2008 | Singh ..................... | H04W 28/18 370/329 |
| 2011/0019646 A1* | 1/2011 | Jeon ....................... | H04W 84/12 370/331 |
| 2011/0299423 A1 | 12/2011 | Shim et al. | |
| 2013/0170470 A1 | 7/2013 | Kneckt et al. | |
| 2014/0233536 A1* | 8/2014 | Kang ................. | H04W 72/1215 370/336 |
| 2016/0066346 A1* | 3/2016 | Azad ...................... | H04W 48/10 370/312 |
| 2016/0316504 A1* | 10/2016 | Choi ..................... | H04W 8/005 |
| 2016/0345282 A1* | 11/2016 | Maca .................... | H04W 48/16 |
| 2017/0265153 A1* | 9/2017 | Grady ..................... | H04L 25/20 |
| 2018/0167969 A1* | 6/2018 | Yeo ........................ | H04W 74/02 |
| 2019/0020414 A1* | 1/2019 | Jiang ...................... | H04W 74/04 |

(Continued)

*Primary Examiner* — Khai Tran
(74) *Attorney, Agent, or Firm* — Krista Y. Chan; Frank D. Cimino

(57) ABSTRACT

A wireless network with network-level channel hopping. A wireless network includes a wireless device. The wireless device includes a receiver, a data channel selector, and a transmitter. The receiver is configured to receive a beacon signal comprising a beacon sequence value. The data channel selector is configured to select, as a pseudorandom function of the beacon sequence value, a data channel on which to transmit in an interval following reception of the beacon signal. The transmitter is configured to transmit on the data channel selected by the channel selector.

20 Claims, 4 Drawing Sheets

(56) References Cited

U.S. PATENT DOCUMENTS

2019/0021055 A1* 1/2019 Guo ................ H04L 43/10
2019/0215851 A1* 7/2019 Li .................. H04W 72/1289

* cited by examiner

WIRELESS NETWORK WITH CHANNEL HOPPING

CROSS-REFERENCE TO RELATED APPLICATIONS

This application is a continuation of U.S. patent application Ser. No. 16/140,028 filed Sep. 24, 2018, which is incorporated herein by reference in its entirety.

BACKGROUND

In a wireless network, the frequency range in which the network operates can be divided into multiple frequency bands or channels. Each of the channels can be used for communication of data. In a channel hopping system, a wireless device changes with time which of the channels is used for data is transmission or reception. Channel hopping can be used to increase network throughput by providing simultaneous data transfer over multiple channels and/or to improve system reliability in difficult channel conditions by exploiting channel diversity.

SUMMARY

A method and apparatus for channel hopping in a wireless network are disclosed herein. In one example, a wireless network includes a wireless device. The wireless device includes a receiver, a data channel selector, and a transmitter. The receiver is configured to receive a beacon signal comprising a beacon sequence value. The data channel selector is configured to select, as a pseudorandom function of the beacon sequence value, a data channel on which to transmit in an interval following reception of the beacon signal. The transmitter is configured to transmit on the data channel selected by the channel selector.

In another example, a method includes receiving, by a wireless device, a beacon signal comprising a beacon sequence value. As a pseudorandom function of the beacon sequence value, the wireless device selects a data channel on which to transmit following reception of the beacon signal. The wireless device transmits on the data channel.

In a further example, wireless device includes a receiver, a data channel selector, and a transmitter. The receiver is configured to receive a first beacon signal comprising a first beacon sequence value. The data channel selector is configured to select, as a pseudorandom function of the first beacon sequence value, a data channel on which to transmit in an interval following reception of the beacon signal. The transmitter is configured to transmit data on the data channel selected by the data channel selector, and to transmit a second beacon signal comprising a second beacon sequence value.

BRIEF DESCRIPTION OF THE DRAWINGS

For a detailed description of various examples, reference will now be made to the accompanying drawings in which.

DETAILED DESCRIPTION

Figure 1:
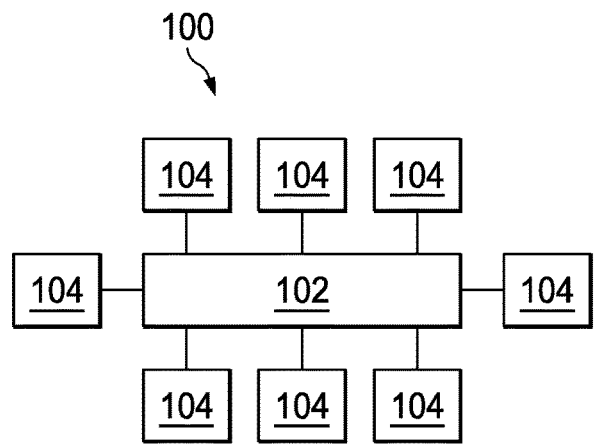
FIG. 1 shows a block diagram for an example wireless network that includes channel hopping and is arranged in a star topology in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Various channel hopping methods have been implemented in wireless systems. Such methods include Time Slotted Channel Hopping (TSCH) and un-slotted channel hopping. In TSCH, communication time is divided into multiple slots. Each slot is then assigned to a specific node (or network device) for transmission on a specific channel. Each SlotFrame includes a plurality of slots and is marked with a beacon slot where a coordinator transmits a beacon on a specific channel containing slot allocation information. In TSCH, slot allocation can be complex and packet size is limited by slot duration.

In un-slotting channel hopping, there is no central coordination of channel access. Each node maintains a broadcast schedule and a unicast schedule. A node transmits broadcast data in accordance with its broadcast schedule and all neighbor nodes listen in the channel used for transmission. When unicasting, each node applies a receiver directed unicast channel hopping schedule. That is, when a node has data to transmit to a different node, the transmitting node uses the channel on which the receiving node is listening at transmission time. Unicast channel hopping slots may not be synchronized from node to node. Nodes execute a discovery procedure that includes transmission of channel hopping information on all channels. Each node must maintain a neighbor table that includes the channel hopping information for all other nodes. Timing information must be exchanged to maintain synchronization of timing for identification of channels used. The overhead associated with the discovery procedure required in un-slotted channel hopping is high, and maintaining hopping sequences and timing information for neighboring nodes increases network complexity.

The wireless network disclosed herein employs network level channel hopping to reduce synchronization and other network overhead. Reduction of overhead, in turn, reduces the power consumed by a network device which increases the operational life of a battery powered device. In implementations of the wireless network, a coordinator device periodically transmits a beacon signal that includes a beacon sequence number. Devices receiving the beacon signal apply the beacon sequence number as input to a pseudorandom number generator, the output of which identifies the channel to use for transmission throughout the network. All network devices include the same pseudorandom number generator for data channel selection. Time between beacon signals defines a contention access period. In the contention access period, all network devices contend for access to the data channel identified using the beacon sequence number. Beacon signal transmission also uses channel hopping that is defined by application of the beacon sequence number to a pseudorandom number generator. The pseudorandom number generator applied to select a beacon channel may produce different channel values than the pseudorandom number generator applied to select a data channel.

Because each device in the wireless network selects the data channel based on the beacon sequence number, implementations of the wireless network operate without centralized channel assignment or transmission of channel assignment information, and the associated overhead. The devices of the wireless network do not maintain neighbor information because, at any given time, all devices use the same data channel.

FIG. 1 shows a block diagram for an example wireless network 100 that includes channel hopping and is arranged in a star topology in accordance with the present disclosure. The wireless network 100 includes a wireless device 102 and at least one wireless device 104. Implementations of the wireless network 100 may include multiple instances of the wireless device 104. The wireless device 102 operates as a coordinator for the wireless network 100. The wireless device 104 communicates with the wireless device 102. In some instances of the wireless network 100, the wireless device 102 and the wireless device 104 are configured for half-duplex operation. That is, at any given time, the wireless device 102 or the wireless device 104 may transmit or receive, but not transmit and receive.

In the wireless network 100, the total frequency range within which the wireless device 102 and the wireless device 104 communicate is divided into multiple sub-bands or channels. For example, an implementation of the wireless network 100 operates in a frequency range of 902.2 megahertz (MHz) to 928.2 MHz, where the total frequency range (26 MHz) is subdivided into 129 channels each with a 200 kilohertz bandwidth. The wireless device 102 and the wireless device 104 implement channel hopping to improve communication reliability in difficult channel conditions.

Figure 2A:
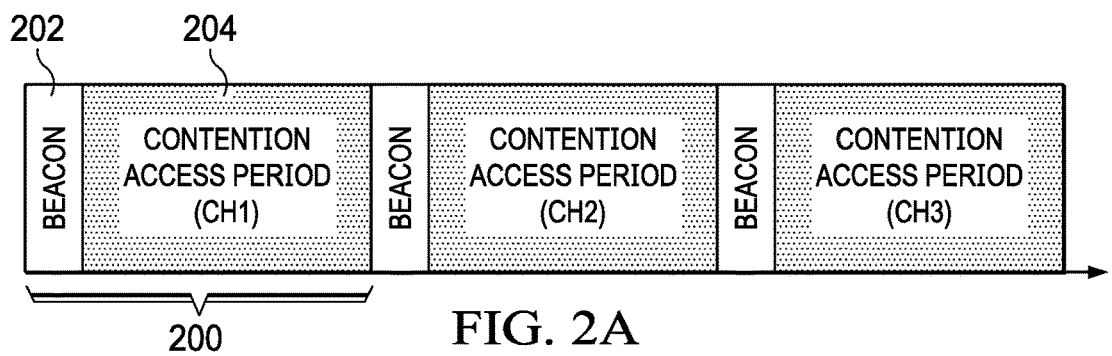
FIGS. 2A and 2B shows examples of frames implemented in channel hopping in accordance with the present disclosure.
Figure 3:
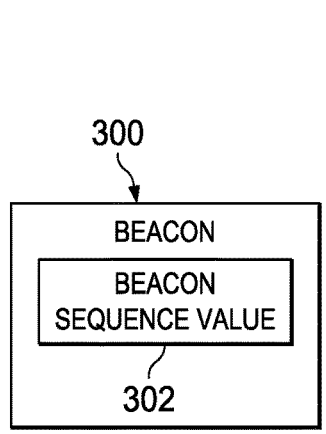
FIG. 3 shows an example of a beacon signal in accordance with the present disclosure.

FIG. 2A shows an example of communication frames implemented in channel hopping in accordance with the present disclosure. The frame 200 includes a beacon transmission interval 202 and a contention access period 204 that follows the beacon transmission interval 202. In the beacon transmission interval 202, the wireless device 102 transmits a beacon signal. FIG. 3 shows a representation of an example beacon signal 300. The beacon signal 300 includes a beacon sequence value 302. The beacon sequence value 302 may be a numeric value generated by the wireless device 102 and transmitted by the wireless device 102 as part of the beacon signal 300. The beacon sequence value 302 may be, for example, a numeric value that is incremented with each successive beacon transmission interval 202. The channel on which the wireless device 102 transmits the beacon signal 300 varies from frame to frame.

The wireless device 104 receives the beacon signal 300 and extracts the beacon sequence value 302 therefrom. In the wireless network 100, a set of channels (i.e., a set of data channels) are assigned for use in channel hopping of transmissions from the wireless device 104 to the wireless device 102. The set of data channels is stored in the wireless device 102 and the wireless device 104. The wireless device 104 applies the beacon sequence value 302 as input to a pseudorandom function that selects, based on the beacon sequence value 302, a data channel from the predetermined set of data channels.

data channel=PseudoRandomFunction(BeaconSequenceValue,DataChannelSet)

The wireless device 104 transmits, on the selected data channel, to the wireless device 102 during the contention access period 204. Implementations of the wireless device 104 may apply any pseudorandom function to select the data channel from the set of channels assigned to channel hopping of the data channel. The wireless device 102 applies the same pseudorandom function to select the data channel on which to receive data transmitted by the wireless device 104 during the contention access period 204.

During the contention access period 204, any number of the wireless device 104 may transmit to the wireless device 102. The wireless devices 104 contend for access to the data channel during the contention access period 204. Some implementations of the wireless device 104 apply carrier sense multiple access/collision avoidance (CSMA/CA) to contend for the use of the data channel.

In the wireless network 100, a set of channels (i.e., a set of beacon channels) are assigned for use in channel hopping of beacon transmissions from the wireless device 104 to the wireless device 102. The set of beacon channels is stored in the wireless device 102 and the wireless device 104. The channels included in the set of beacon channels may be different from the channels included in the set of data channels (e.g., the beacon channel set and the data channel set may be disjoint in some implementations). The wireless device 104 applies the beacon sequence value 302 as input to a pseudorandom number generator that selects, based on the beacon sequence value 302, a beacon channel from the predetermined set of beacon channels.

beacon channel=PseudoRandomFunction(BeaconSequenceValue,BeaconChannelSet)

The wireless device 104 receives, on the beacon channel selected by the pseudorandom function, the beacon signal 300 transmitted in the next frame 200.

The wireless device 102 applies the same pseudorandom number generator as the wireless device 104 to select the data channel on which to receive data and the beacon channel on which to transmit the beacon signal 300.

Figure 2B:
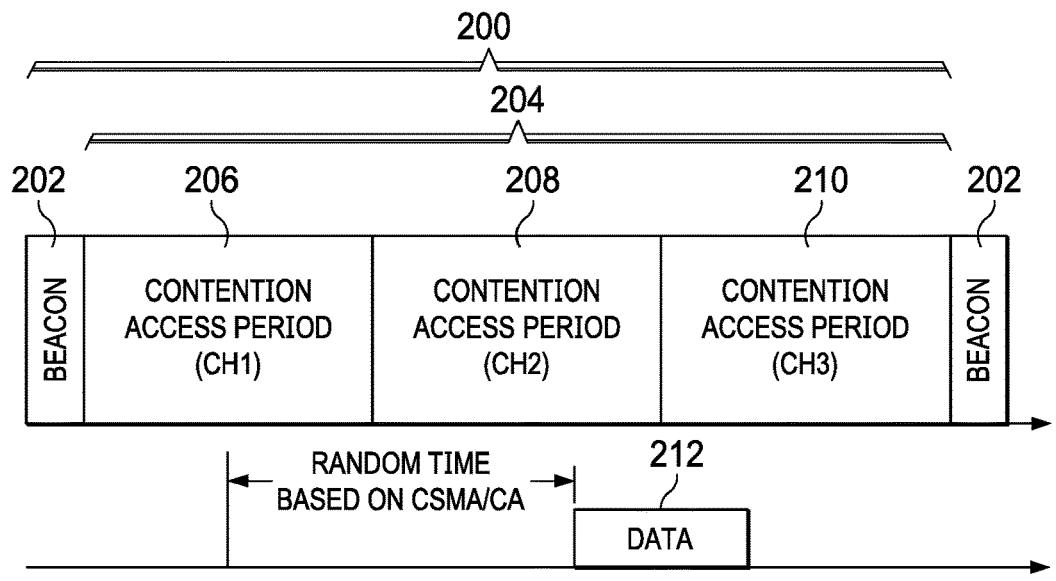

FIG. 2B shows another example of communication frames that may be used to implement channel hopping in the wireless network 100. The frame 200 includes a beacon transmission interval 202 and a contention access period 204 that follows the beacon transmission interval 202. In the beacon transmission interval 202, the wireless device 102 transmits the beacon signal 300. The contention access period 204 is divided in a number of contention access sub-periods 206, 208, 210, where a different data channel is selected for use in each of the contention access sub-periods. For example, the pseudorandom function applied to select a data channel may return a number of data channels based on the beacon sequence value 302.

[CH1,CH2,CH3]=PseudoRandomFunction(BeaconSequenceValue,DataChannelSet)

When changing the data channel during the contention access period 204, as shown in FIG. 2B, if a wireless device 104 begins data transmission on a first data channel, then data transmission continues on the first data channel regardless of whether the period for use of the first data channel has expired. In FIG. 2A, each of the contention access sub-periods 206, 208, 210 is allocated an equal time period. In some implementations, different time periods may be allocated to different contention access sub-periods. The data transmission 212 begins in contention access sub-period 208 using data channel 2. The data transmission 212 continues to use data channel 2 until the transmission is complete, even though the transmission extends into the time period allocated to contention access sub-period 210, which uses data channel 3.

Figure 4:
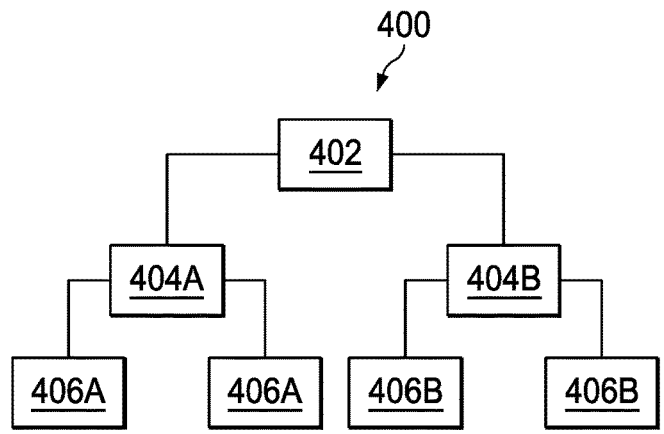
FIG. 4 shows a block diagram for an example wireless network that includes channel hopping and is arranged in a tree topology in accordance with the present disclosure.

FIG. 4 shows a block diagram for an example wireless network 400 that includes channel hopping and is arranged in a tree topology in accordance with the present disclosure. The wireless network 400 includes a wireless device 402, a wireless device 404A and wireless device 404B (each also referred to as a wireless device 404), and a wireless device 406A and a wireless device 406B (each also referred to as a wireless device 406). Implementations of the wireless network 400 may include any number of instances of the wireless device 404 and/or any number of instances of the wireless device 406 arranged as any number of branches and levels. The wireless device 402 operates as a coordinator for the wireless devices 404, and each wireless device 404 operates as a coordinator for one or more wireless device 406. The wireless device 404 transmits data to the wireless device 402, and each wireless device 406 transmits data to a wireless device 404. In some implementations of the wireless network 400, the wireless device 402, the wireless device 404, and the wireless device 406 are configured for half-duplex operation. That is, at any given time, the wireless device 402, the wireless device 404, or the wireless device 406 may transmit or receive, but not transmit and receive.

Like, the wireless network 100, the total frequency range within which the wireless network 400 operates is divided into multiple sub-bands or channels, and the wireless device 402, the wireless device 404, and the wireless device 406 implement channel hopping to improve communication reliability in the wireless network 400.

Figure 5:
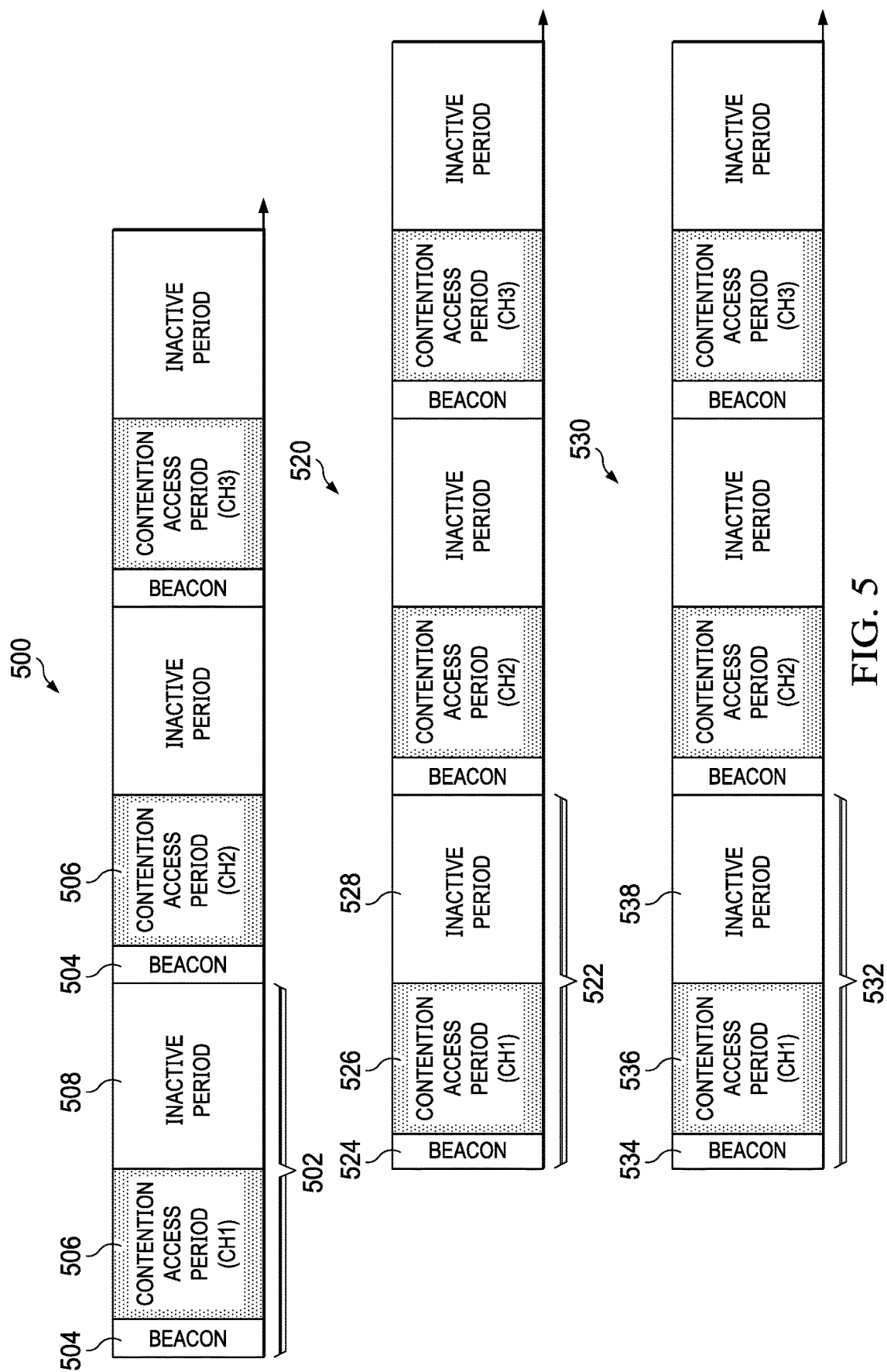
FIG. 5 shows an example of frames implemented in channel hopping in a tree topology in accordance with the present disclosure.

FIG. 5 shows an example of communication frames implemented in channel hopping in the wireless network 400. Communication between the wireless device 402 and the wireless device 404 is via the frames 500. The frame 502 includes a beacon transmission interval 504, a contention access period 506 that follows the beacon transmission interval 504, and an inactive period 508 that follows the contention access period 506. In the beacon transmission interval 504, the wireless device 402 transmits a beacon signal 300.

The wireless device 404 receives the beacon signal 300 transmitted by the wireless device 402 and applies the beacon sequence value 302 as input to a pseudorandom function to select a data channel from a set of data channels assigned for use in channel hopping of data transmission from the wireless device 404 to the wireless device 402, and to select a beacon channel from a set of beacon channels assigned for use in channel hopping of beacon transmission from the wireless device 402 to the wireless device 404. The wireless device 404 transmits to the wireless device 402 during the contention access period 506 on the data channel selected using the pseudorandom function and the beacon sequence value 302. The wireless device 402 applies the same pseudorandom function as the wireless device 404 to select the data channel on which to receive data transmitted by the wireless device 404, and to select the beacon channel on which to transmit during the beacon transmission interval 504. The instances of the wireless device 404 contend for access to the data channel during the contention access period 506.

In the inactive period 508, neither the wireless device 402 nor the wireless device 404 transmit. Transmissions of the frames 520 and the frames 530 occur in the inactive period 508. Communication between the wireless device 404A and instances of the wireless device 406A is via the frames 520. The frame 522 includes a beacon transmission interval 524, a contention access period 526 that follows the beacon transmission interval 524, and an inactive period 528 that follows the contention access period 526. In the beacon transmission interval 524, the wireless device 404A transmits a beacon signal 300. The beacon sequence value 302 included in the beacon signal 300 transmitted by the wireless device 404A may be different from the beacon sequence value 302 transmitted by the wireless device 402 to insure that the channel hopping sequence of data transmissions to the wireless device 404A is different from the channel hopping sequence of data transmissions to the wireless device 402.

The wireless device 406A receives the beacon signal 300 transmitted by the wireless device 404A and applies the beacon sequence value 302 to a pseudorandom function to select a data channel from the set of data channels assigned for use in channel hopping of data transmissions from the wireless device 406A to the wireless device 404A, and to select a beacon channel from a set of beacon channels assigned for use in channel hopping of beacon transmission from the wireless device 404A to the wireless device 406A. The wireless device 406A transmits to the wireless device 404A during the contention access period 526 on the selected data channel. The wireless device 404A applies the same pseudorandom function as the wireless device 406A to select the data channel on which to receive data transmitted by the wireless device 406A, and to select the beacon channel on which to transmit during the beacon transmission interval 524. Instances of the wireless device 406A contend for access to the data channel during the contention access period 526. The data channels and the beacon channels applied in the frames 520 may be different from the data channels and the beacon channels applied in the frames 500. The inactive period 528 overlaps the beacon transmission interval 504 and the contention access period 506 of the frames 500.

Communication between the wireless device 404B and the wireless device 406B is via the frames 530. The frame 532 includes a beacon transmission interval 534, a contention access period 536 that follows the beacon transmission interval 534, and an inactive period 538 that follows the contention access period 536. In the beacon transmission interval 534, the wireless device 404B transmits a beacon signal 300. The beacon sequence value 302 included in the beacon signal 300 transmitted by the wireless device 404B may be different from the beacon sequence value 302 transmitted by the wireless device 402 or the wireless device 404A to insure that the channel hopping sequence of data transmissions to the wireless device 404B is different from the channel hopping sequence of data transmissions to the wireless device 402 or the wireless device 404A.

The wireless device 406B receives the beacon signal 300 transmitted by the wireless device 404B and applies the beacon sequence value 302 to a pseudorandom function to select a data channel from a set of data channels assigned for use in channel hopping of data transmissions from the wireless device 406B to the wireless device 404B, and to select a beacon channel from a set of beacon channels assigned for use in channel hopping of beacon transmissions from the wireless device 404B to the wireless device 406B. The wireless device 406B transmits to the wireless device 404B during the contention access period 536 on the selected data channel. The wireless device 404B applies the same pseudorandom function as the wireless device 406B to select the data channel on which to receive data transmitted by the wireless device 406B, and to select the beacon channel on which to transmit during the beacon transmission interval 534. Instances of the wireless device 406B contend for access to the data channel during the contention access period 536. The data channels and the beacon channels applied in the frames 530 may be different from the data channels and the beacon channels applied in the frames 500 and/or the frames 520. The inactive period 538 overlaps the beacon transmission interval 504 and the contention access period 506 in the frames 500.

Figure 6:
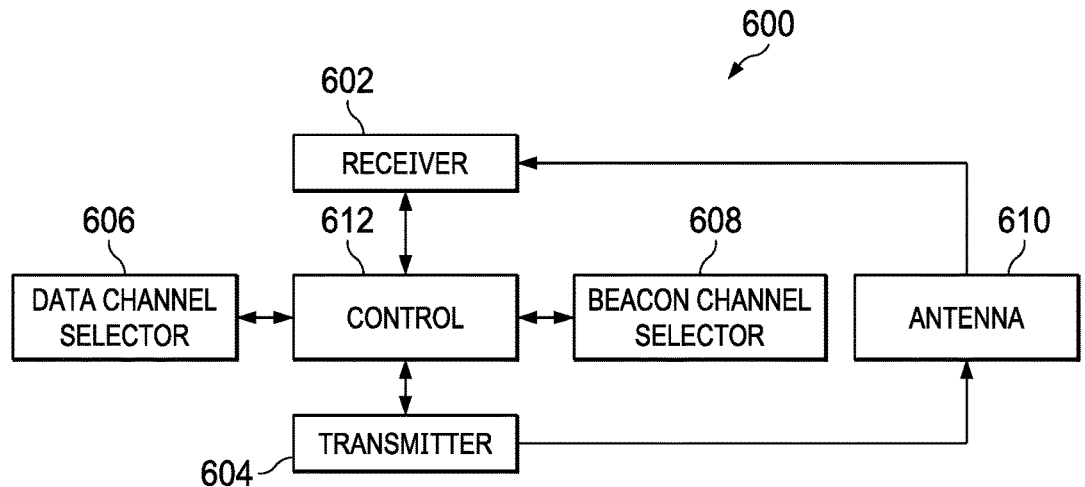
FIG. 6 shows a block diagram for an example wireless device that includes channel hopping in accordance with the present disclosure.

FIG. 6 shows a block diagram for an example wireless device 600 that includes channel hopping in accordance with the present disclosure. The wireless device 600 is an implementation of the wireless device 102, the wireless device 104, the wireless device 402, the wireless device 404, and/or the wireless device 406, and can be used to implement the wireless network 100 or the wireless network 400. The wireless device 600 includes a receiver 602, a transmitter 604, a data channel selector 606, a beacon channel selector 608, an antenna 610, and a control circuit 612. The wireless device 600 may include various other systems and/or components that that have been omitted from FIG. 6 in the interest of clarity. For example, the wireless device 600 may include batteries, power supplies, sensors, memory, etc.

The receiver 602 and the transmitter 604 are coupled to the antenna 610. The antenna 610 converts electromagnetic signals to electrical signals that are provided to the receiver 602, and converts electrical signals generated by the transmitter 604 to electromagnetic signals. The receiver 602 includes circuitry that extracts information from the signals detected by the antenna 610. For example, the receiver 602 may include a low noise amplifier circuit, a mixer circuit, a demodulator circuit, a decoder circuit, and/or other circuits to process the signals received from the antenna 610 and extract the data encoded in the signals. The data extracted from received signals by the receiver 602 may be provided to the control circuit 612. For example, the receiver 602 processes the beacon signal 300, extracts the beacon sequence value 302 from the beacon signal 300, and provides the beacon sequence value 302 to the control circuit 612.

The transmitter 604 includes circuitry that generates and processes signals for transmission via the antenna 610. The circuitry of the transmitter 604 may include a power amplifier circuit, a mixer circuit, a modulator circuit, an encoder circuit, etc. For example, signal output by a sensor included in the wireless device 600 may be digitized and provided to the transmitter 604 for transmission. The transmitter 604 may encode, modulate, and up-convert the sensor output data for transmission via the antenna 610. Similarly, the transmitter 604 may process a beacon signal 300 for transmission via the antenna 610. For example, the control circuit 612 may provide beacon data including the beacon sequence value 302 to the transmitter 604 for transmission.

The data channel selector 606 selects a data channel to be used by the transmitter 604 for transmission of data signals or to be used by the receiver 602 for reception of data signals. For example, the data channel selector 606 may select a data channel based on the beacon sequence value 302 extracted from the beacon signal 300 by the receiver 602, or based on the beacon sequence value 302 transmitted in the beacon signal 300 by the transmitter 604. In some implementations of the wireless device 600, the data channel selector 606 may be incorporated in the control circuit 612. The data channel selector 606 includes a list (i.e., a set) of data channels from which to select, and applies a pseudorandom function to select a data channel from the list based on the beacon sequence value 302.

The beacon channel selector 608 selects a beacon channel to be used by the transmitter 604 for transmission of the beacon signal 300 or to be used by the receiver 602 for reception of the beacon signal 300. For example, the beacon channel selector 608 may select a beacon channel based on the beacon sequence value 302 extracted from the beacon signal 300 by the receiver 602, or based on the beacon sequence value 302 transmitted in the beacon signal 300 by the transmitter 604. In some implementations of the wireless device 600, the beacon channel selector 608 may be incorporated in the control circuit 612. The beacon channel selector 608 includes a list (i.e., a set) of beacon channels from which to select, and applies a pseudorandom function to select a beacon channel from the list based on the beacon sequence value 302. The channels included in the list of beacon channels applied by the beacon channel selector 608 may be different from the channels included in the list of data channels applied by the data channel selector 606.

The control circuit 612 may include a microcontroller that executes instructions stored in a memory to control the operations of the wireless device 600. For example, if the wireless device 600 is used to implement the wireless device 102, then the control circuit 612 may include a counter that is incremented with each transmission of the beacon signal 300, where the value of the counter is the beacon sequence value 302 to be transmitted in the next beacon signal 300.

Figure 7:
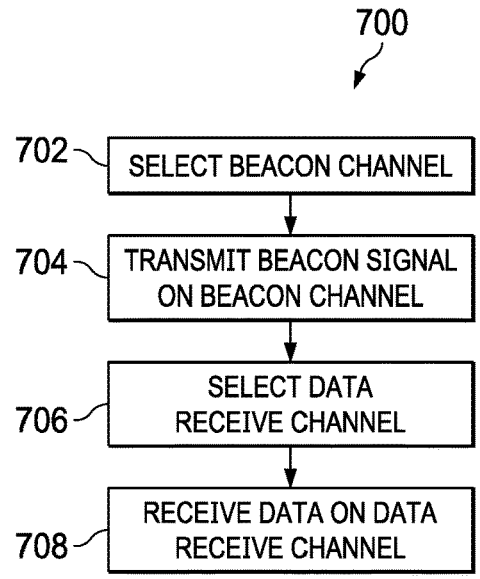
FIGS. 7 and 8 show flow diagrams for example methods for operation of a wireless device that includes channel hopping in accordance with the present disclosure.

FIG. 7 shows a flow diagram for an example method 700 for operation of a wireless device that includes channel hopping in accordance with the present disclosure. Though depicted sequentially as a matter of convenience, at least some of the actions shown can be performed in a different order and/or performed in parallel. Additionally, some implementations of the method 700 may perform only some of the actions shown. Operations of the method 700 may be performed by an implementation of the wireless device 600 operating as a coordinator (e.g., the wireless device 102 of the wireless network 100 or the wireless device 402 of the wireless network 400).

In block 702, the wireless device 102 selects a beacon channel on which to transmit the beacon signal 300. Selection of a beacon channel includes providing a beacon sequence value 302 to the beacon channel selector 608. The beacon channel selector 608 applies the beacon sequence value 302 as input to a pseudorandom function that selects a beacon channel from a set of channels assigned for beacon transmission.

In block 704, the wireless device 102 updates the beacon sequence value 302 and transmits the beacon signal 300 on the beacon channel selected in block 702. Updating the beacon sequence value 302 may include incrementing the beacon sequence value 302.

In block 706, the wireless device 102 selects one or more data channels on which to receive data transmissions during the access period that follows transmission of the beacon signal 300. Selection of a data channel may include providing the beacon sequence value 302 transmitted in block 704 to the data channel selector 606. The data channel selector 606 applies the beacon sequence value 302 as input to a pseudorandom function that selects a data channel from a set of channels assigned for data transmission. The set of channels assigned for data transmission may be different from the set of channels assigned for beacon transmission. In some implementations, the same channels may be assigned to data transmission and beacon transmission.

In block 708, the wireless device 102 receives data transmissions on the one or more data channels selected in block 706. The method 700 may continue with selection of the next beacon channel in block 702.

Figure 8:
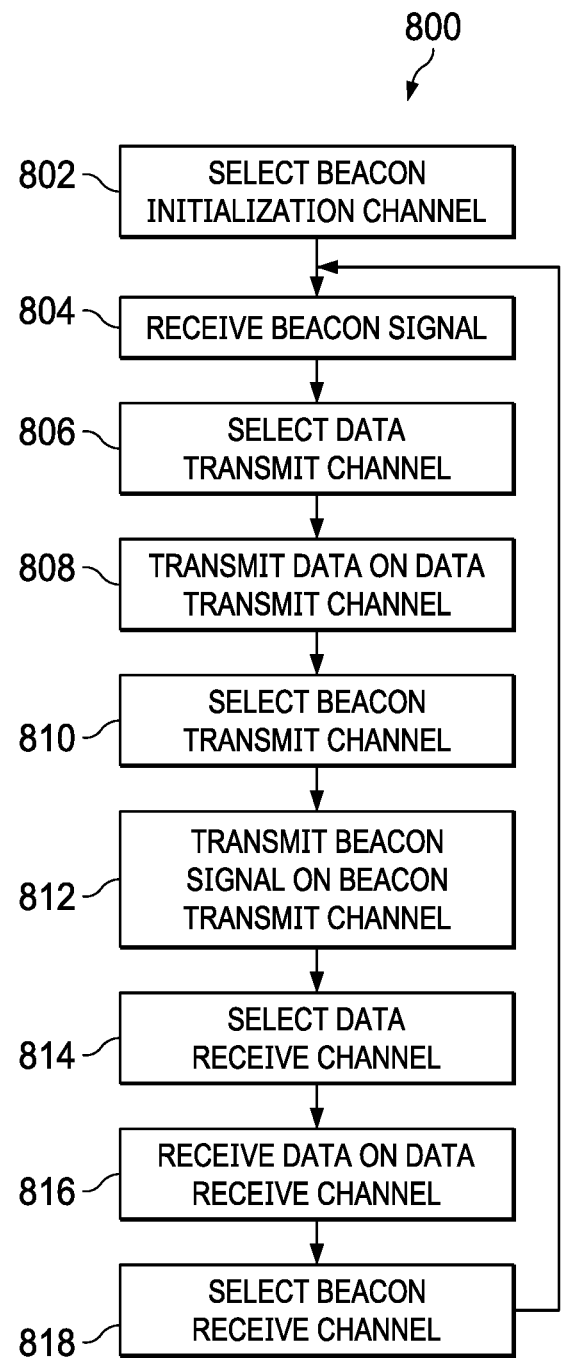

FIG. 8 shows a flow diagram for an example method 800 for operation of a wireless device that includes channel hopping in accordance with the present disclosure. Though depicted sequentially as a matter of convenience, at least some of the actions shown can be performed in a different order and/or performed in parallel. Additionally, some implementations of the method 800 may perform only some of the actions shown. Operations of the method 800 may be performed by an implementation of the wireless device 600 operating as, for example, a wireless device 104 of the wireless network 100, a wireless device 404 of wireless network 400, or wireless device 406 of the wireless network 400.

In block 802, the wireless device 404 selects a beacon initialization channel. The wireless device 404 sets the receiver 602 to listen for a beacon signal 300 on the beacon initialization channel until a beacon signal 300 is received. The beacon initialization channel may be any of the channels assigned to beacon transmission.

In block 804, the wireless device 404 receives the beacon signal 300 on the selected beacon channel. With reception of a beacon signal 300 on the selected beacon channel, the wireless device 404 can determine the beacon channel on which the beacon signal 300 will be transmitted in the next frame, and determine the data channel on which to transmit in the current frame.

In block 806, the wireless device 404 extracts the beacon sequence value 302 from the beacon signal 300 and selects one or more data channels on which to transmit data during the access period that follows reception of the beacon signal 300. Selection of a data channel may include providing the beacon sequence value 302 received in 804 to the data channel selector 606. The data channel selector 606 applies the beacon sequence value 302 as input to a pseudorandom function that selects a data channel from a set of channels assigned for data transmission. The set of channels assigned for data transmission may be different from the set of channels assigned for beacon transmission. In some implementations, the same channels may be assigned to data transmission and beacon transmission.

In block 808, the wireless device 404 contends for access to, and transmits data on, the data channel selected in block 806.

In block 810, the wireless device 404 selects a beacon channel on which to transmit the beacon signal 300. Selection of a beacon channel includes providing a beacon sequence value 302 to the beacon channel selector 608. The beacon sequence value 302 provided to the beacon channel selector 608 may be different from the beacon sequence value 302 received in block 804. The beacon channel selector 608 applies the beacon sequence value 302 as input to a pseudorandom function that selects a beacon channel from a set of channels assigned for beacon transmission.

In block 812, the wireless device 402 updates the beacon sequence value 302 and transmits the beacon signal 300 on the beacon channel selected in block 810. Updating the beacon sequence value 302 may include incrementing the beacon sequence value 302.

In block 814, the wireless device 404 selects one or more data channels on which to receive data transmissions during the access period that follows transmission of the beacon signal 300. Selection of a data channel may include providing the beacon sequence value 302 transmitted in block 812 to the data channel selector 606. The data channel selector 606 applies the beacon sequence value 302 as input to a pseudorandom function that selects a data channel from a set of channels assigned for data transmission. The set of channels assigned for data transmission may be different from the set of channels assigned for beacon transmission. In some implementations, the same channels may be assigned to data transmission and beacon transmission.

In block 816, the wireless device 402 receives data transmissions on the one or more data channels selected in block 814. The wireless device 402 may transmit the received data in a subsequent operation of block 808.

In block 818, the wireless device 402 selects a beacon channel on which to receive the next transmitted beacon signal 300. Selection of a beacon channel includes providing the beacon sequence value 302 received in 804 to the beacon channel selector 608. The beacon channel selector 608 applies the beacon sequence value 302 as input to a pseudorandom function that selects a beacon channel from a set of channels assigned for beacon transmission.

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a wireless device, a first beacon on a first beacon channel during a first frame, wherein the first beacon includes a first beacon sequence value;
determining, by the wireless device, a first data channel based on the first beacon sequence value;
transmitting, by the wireless device, a first set of data on the first data channel during the first frame;
determining a second beacon channel based on the first beacon sequence value;
determining, by the wireless device, a second beacon sequence value based on the first beacon sequence value; and
receiving, by the wireless device, a second beacon on the second beacon channel during a second frame, wherein the second beacon includes the second beacon sequence value.

2. The method of claim 1, wherein:
the determining of the first data channel is based on the first beacon sequence value used as a first input to a first pseudorandom number generator; and
the determining of the second beacon sequence value is based on the first beacon sequence value used as a second input to a second pseudorandom number generator.

3. The method of claim 1, wherein:
the first frame includes a first beacon transmission interval and a first contention access period subsequent to the first beacon transmission interval; and the second frame includes a second beacon transmission interval and a second contention access period subsequent to the second beacon transmission interval.

4. The method of claim 3, wherein:
the first beacon is received during the first beacon transmission interval;
the first set of data is transmitted during the first contention access period; and
the second beacon is received during the second beacon transmission interval.

5. The method of claim 3, wherein:
the first frame includes a first inactive period subsequent to the first contention access period; and
the second frame includes a second inactive period subsequent to the second contention access period.

6. The method of claim 1, further comprising:
transmitting, by the wireless device, a third beacon on a third beacon channel during a third frame, wherein the third beacon includes a third beacon sequence value;
determining, by the wireless device, a second data channel based on the third beacon sequence value;
receiving, by the wireless device, a second set of data on the second data channel during the third frame; and
transmitting, by the wireless device, a fourth beacon on a fourth beacon channel during a fourth frame, wherein the fourth beacon includes a fourth beacon sequence value.

7. The method of claim 6, wherein:
the second frame is subsequent to the first frame;
the fourth frame is subsequent to the third frame;
the third frame is coextensive with the first frame and the second frame; and
the fourth frame is coextensive with the second frame.

8. The method of claim 6, wherein:
the second set of data is received from a first node, by the wireless device, at a first time in a contention access period of the third frame.

9. The method of claim 8, further comprising:
receiving, by the wireless device, a third set of data from a second node at a second time in the contention access period of the third frame.

10. A wireless device, comprising:
an antenna;
a receiver coupled to the antenna, the receiver configured to receive a first beacon on a first beacon channel during a first frame, wherein the first beacon includes a first beacon sequence value;
a data channel selector configured to select a first data channel based on the first beacon sequence value;
a transmitter coupled to the antenna, the transmitter configured to transmit a first set of data on the first data channel during the first frame; and
a beacon channel selector configured to select a second beacon channel based on the first beacon sequence value; and
a control circuit configured to determine a second beacon sequence value based on the first beacon sequence value;
wherein the receiver is configured to receive a second beacon on the second beacon channel during a second frame, and the second beacon includes the second beacon sequence value.

11. The wireless device of claim 10, wherein:
the data channel selector includes a first pseudorandom number generator configured to generate the first data channel based on the first beacon sequence value; and
the beacon channel selector includes a second pseudorandom number generator configured to generate the second beacon channel based on the first beacon sequence value.

12. The wireless device of claim 10, wherein:
the first frame includes a first beacon transmission interval and a first contention access period subsequent to the first beacon transmission interval; and
the second frame includes a second beacon transmission interval and a second contention access period subsequent to the second beacon transmission interval.

13. The wireless device of claim 12, wherein:
the first beacon is received during the first beacon transmission interval;
the first set of data is transmitted during the first contention access period; and
the second beacon is received during the second beacon transmission interval.

14. The wireless device of claim 12, wherein:
the first frame includes a first inactive period subsequent to the first contention access period; and
the second frame includes a second inactive period subsequent to the second contention access period.

15. The wireless device of claim 10, further comprising:
a control circuit configured to generate a third beacon sequence value and a fourth beacon sequence value.

16. The wireless device of claim 15, wherein:
the transmitter is configured to transmit a third beacon on a third beacon channel during a third frame, wherein the third beacon includes the third beacon sequence value;
the data channel selector is configured to select a second data channel based on the third beacon sequence value;
the receiver is configured to receive a second set of data on the second data channel during the third frame; and
the transmitter is configured to transmit a fourth beacon on a fourth beacon channel during a fourth frame, wherein the fourth beacon includes the fourth beacon sequence value.

17. The wireless device of claim 16, wherein:
the second frame is subsequent to the first frame;
the fourth frame is subsequent to the third frame;
the third frame is coextensive with the first frame and the second frame; and
the fourth frame is coextensive with the second frame.

18. The wireless device of claim 16, wherein:
the receiver is configured to receive the second set of data from a first node at a first time in a contention access period of the third frame.

19. The wireless device of claim 18, wherein:
the receiver is configured to receive a third set of data from a second node at a second time in the contention access period of the third frame.

20. The wireless device of claim 16, wherein:
the data channel selector is configured to select the first data channel and the second data channel from a set of data channels.

* * * * *